US009974392B1

(12) United States Patent
Bruning et al.

(10) Patent No.: US 9,974,392 B1
(45) Date of Patent: May 22, 2018

(54) ICE HOT SEAT

(71) Applicants: Deborah D. Bruning, Franklin Square, NY (US); Karl H. Bruning, Franklin Square, NY (US)

(72) Inventors: Deborah D. Bruning, Franklin Square, NY (US); Karl H. Bruning, Franklin Square, NY (US)

( * ) Notice: Subject to any disclaimer, the term of this patent is extended or adjusted under 35 U.S.C. 154(b) by 0 days. days.

(21) Appl. No.: 15/382,717

(22) Filed: Dec. 18, 2016

Related U.S. Application Data

(60) Provisional application No. 62/271,986, filed on Dec. 28, 2015.

(51) Int. Cl.
*A47C 7/72* (2006.01)
*A47C 7/02* (2006.01)
*A47C 7/74* (2006.01)
*A47C 9/10* (2006.01)
*A01K 97/01* (2006.01)
*A01K 97/22* (2006.01)
*F21V 33/00* (2006.01)
*F21W 131/301* (2006.01)

(52) U.S. Cl.
CPC .............. *A47C 7/748* (2013.01); *A01K 97/01* (2013.01); *A01K 97/22* (2013.01); *A47C 7/021* (2013.01); *A47C 7/725* (2013.01); *A47C 9/10* (2013.01); *F21V 33/0012* (2013.01); *F21W 2131/301* (2013.01)

(58) Field of Classification Search
CPC ........... A47C 7/021; A47C 7/72; A47C 7/725; A47C 7/74; A47C 7/748; A47C 9/10; A01K 97/01; A01K 97/22
See application file for complete search history.

(56) References Cited

U.S. PATENT DOCUMENTS

| | | | | |
|---|---|---|---|---|
| 208,251 A | * | 9/1878 | Mains | A47J 36/26 126/204 |
| 2,488,014 A | * | 11/1949 | Higman | F24B 1/202 126/15 R |
| 2,904,031 A | * | 9/1959 | Scott | A47C 7/748 126/204 |
| 3,744,842 A | * | 7/1973 | Ronning | A01M 31/025 135/901 |
| 3,751,845 A | * | 8/1973 | Van Leeuwen | A01K 97/05 206/542 |
| 4,913,126 A | * | 4/1990 | McCall | A01K 97/01 126/204 |
| 2003/0131840 A1 | * | 7/2003 | Hubscher | A01K 97/01 126/204 |
| 2008/0006260 A1 | * | 1/2008 | Godbout | A01K 97/01 126/204 |

(Continued)

*Primary Examiner* — Ryan D Kwiecinski
(74) *Attorney, Agent, or Firm* — RG Patent Consulting, LLC; Rachel Gilboy

(57) ABSTRACT

An Ice Hot Seat provides ice fishermen with both heat and light while fishing at night and includes a hollow cylindrical base in the shape of a bucket with a seat on top. A rectangular opening is near the bottom of the base. A liquid gas lantern is placed within the base and a seat having a specially designed heat tunnel is placed on the top of the base. The base is semi-transparent providing light for the nighttime angler. The heat tunnel channels heat from the lantern out through the front of the seat so that an angler can warm their hands. A band with pockets encircles the base to hold extra fishing articles.

8 Claims, 3 Drawing Sheets

(56) References Cited

U.S. PATENT DOCUMENTS

2012/0007391 A1\* 1/2012 McCaslin .............. A01K 97/06
 297/183.1
2017/0202196 A1\* 7/2017 Volk ....................... A01K 97/05

\* cited by examiner

ICE HOT SEAT

CROSS-REFERENCE TO RELATED APPLICATION

The present application is related to and claims priority from prior provisional application Ser. No. 62/271,986, filed Dec. 28, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 21 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of heating and lighting means and more specifically relates to a lantern which is structured and arranged to provide light and heat which is placed within a specially designed base housing providing comfortable seating as well as designed to fit over the round opening on top of the base housing, and allows the angler to be warm and illuminated while fishing, especially ice fishing while at night.

2. Description of the Related Art

Many sportsmen and women enjoy fishing when the weather is cool or cold, and they also enjoy ice fishing. Obviously, keeping warm in the cold temperatures is a challenge. Therefore, a need exists for a new way to keep a person warm while providing him or her with a comfortable place to sit, when fishing in cold weather. Most ice anglers carry a bucket or two for their gear and to provide a place to sit, plus a heater and a light for night fishing. This new product combines all the gear into one package, saving valuable space when transporting or when enclosed in a ventilated ice-fishing shelter.

Various attempts have been made to solve the above-mentioned problems which may be found in the related art but have thus far been unsuccessful. A need therefore exists for a reliable Ice Hot Seat to alleviate the afore-mentioned problems.

BRIEF SUMMARY OF THE INVENTION

In view of the foregoing disadvantages inherent in the known art, the present invention provides a novel Ice Hot Seat. The general purpose of the present invention, which will be described subsequently in greater detail, is to provide a lantern structured and arranged to provide light and heat, which is placed within a specially designed base housing providing comfortable seating as well. Liquid-fueled Coleman lanterns have proven to be very reliable during cold temperatures, and this lantern is an integral part of the design. A cushioned seat, designed to fit over the round opening on the top of the base housing, allows the angler to be warm while fishing.

The present invention holds significant improvements and serves as an Ice Hot Seat. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Ice Hot Seat, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a heating and lighting means and more particularly to an Ice Hot Seat.

Generally speaking, the Ice Hot Seat is structured and arranged to be used to cool/cold weather and ice fisherman and women, as well as anyone else needing a portable light/heat source for outdoor activities. It provides both heat and light, being two very important benefits when fishing in the dark.

Figure 1:
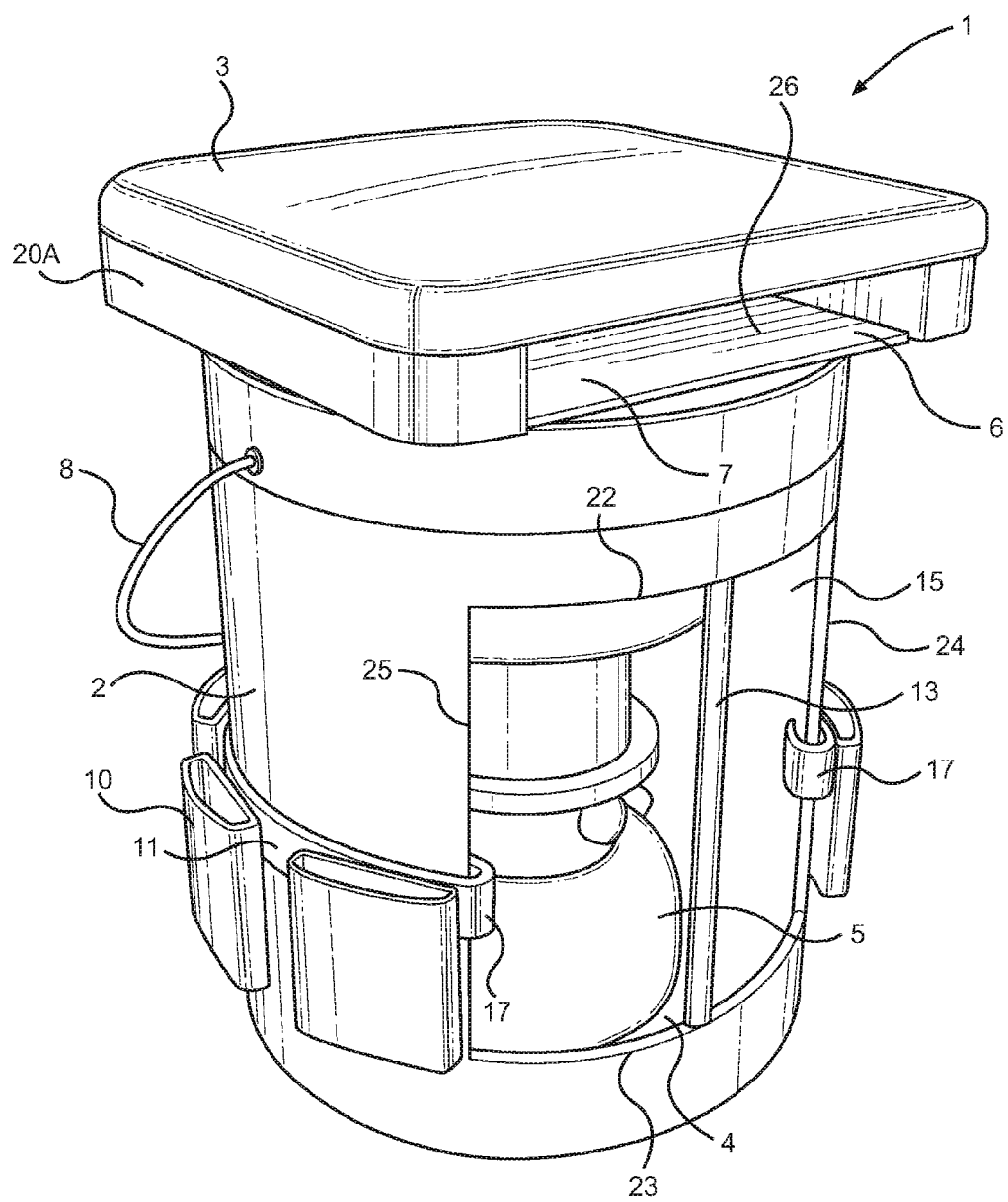
FIG. 1 shows a perspective view illustrating an Ice Hot Seat according to an embodiment of the present invention.

Referring to the drawings by numerals of reference there is shown in FIG. 1, an ice hot seat 1, which provides an ice fisherman with both heat and light while fishing at night. For the night ice fisherman, the ice hot seat 1 comprises a hollow cylindrical base housing 2 in the shape of a bucket and having a closed bottom 19 and an open top 18. Near the bottom 19 is a generally rectangular opening 4. The opening 4 has a top 22, a bottom 23, and opposing sides 24 and 25. The opening 4 has a stabilizing bar 13 extending from the top 22 of the opening 4 to the bottom 23 such that when weight is placed upon the housing 2 the opening 4 and therefore the housing 2 itself will not buckle.

Figure 3:
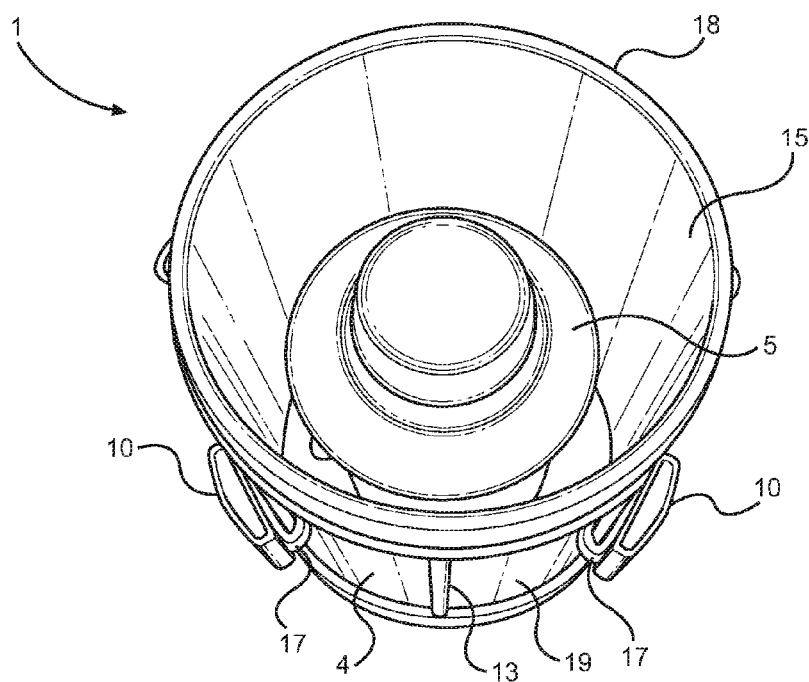
FIG. 3 is a top view illustrating an Ice Hot Seat with the seat cushion off according to an embodiment of the present invention of FIG. 1.

Referring to FIG. 3, a liquid white gas lantern 5 is placed inside the housing 2 near the opening 4. The opening 4 is on the front of the housing 2 and allows the light from the lantern 5 out and the intake of fresh air. The fresh air that comes through the opening 4 is warmed by the lantern 5. The inside of the housing 2 is lined with semi-transparent reflective material 15, to direct light out through the front opening 4. Furthermore, the housing 2 is made of a semi-transparent orange material, so nighttime anglers can walk away to check other tip-ups and find their way back to home base via the glow from the base housing 2. An adjustable window may be provided on the front, to control the intake of air into the lantern chamber and the heat output.

Figure 2:
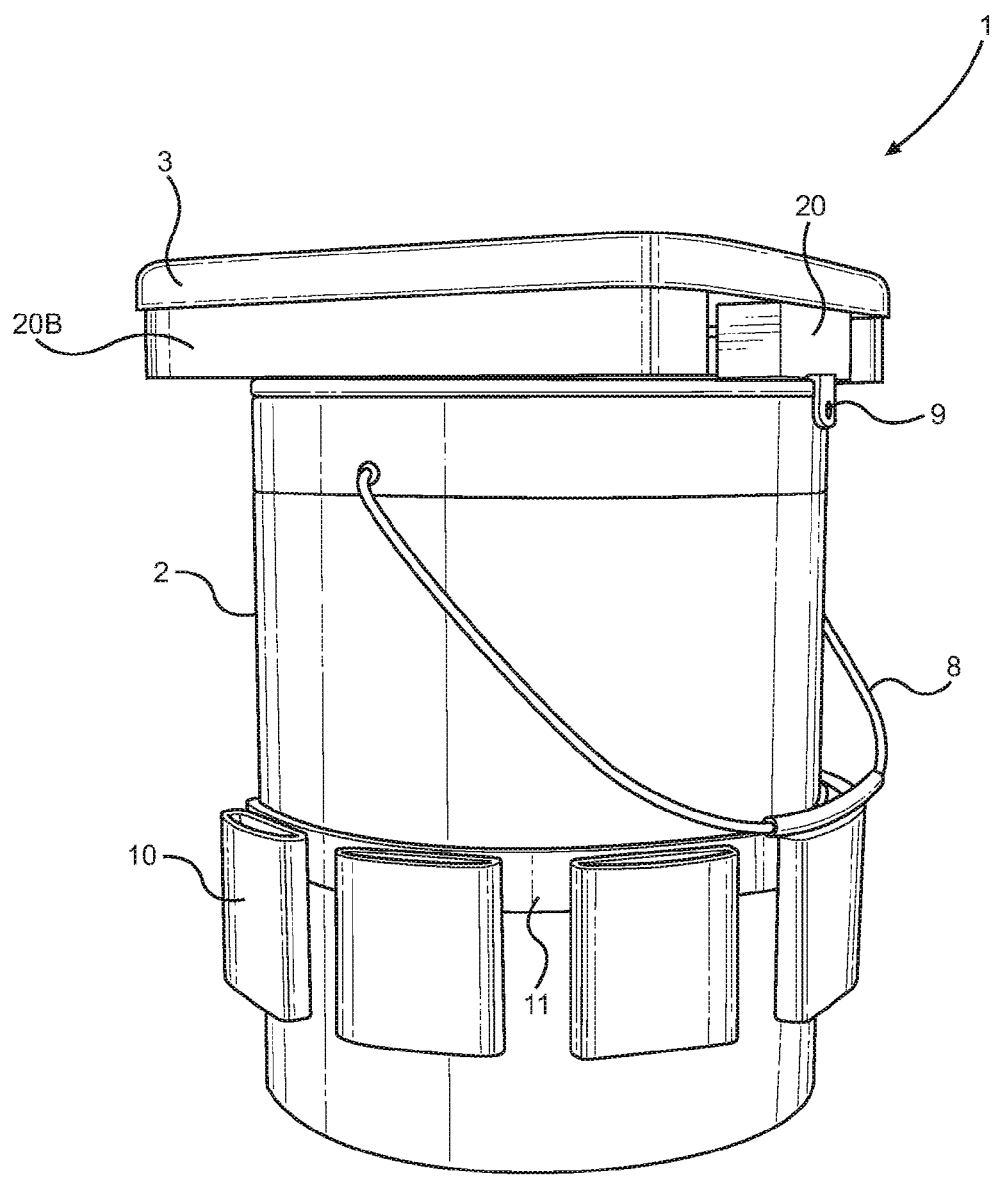
FIG. 2 is a perspective view illustrating a side rear view of the Ice Hot Seat according to an embodiment of the present invention of FIG. 1.
Figure 4:
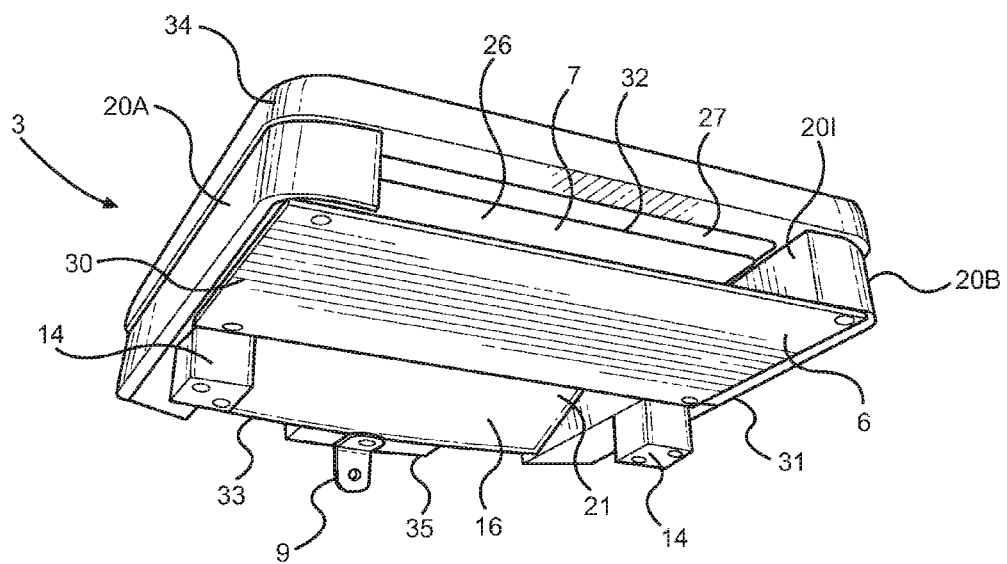
FIG. 4 is a perspective view illustrating the underside of the seat cushion according to an embodiment of the present invention of FIG. 1.

A cushioned seat 3 as seen in FIGS. 1, 2 and 4, with a specially designed heat tunnel 7 is configured to rest upon the open top 18 of the housing 2. The seat 3 is formed of a plywood base 27 having dimensions larger than the open top 18 of the housing 2. The plywood base 27 has a top surface and a bottom surface. The base 27 has opposed first and second sides 30 and 31 and opposed front and rear sides 32 and 33. A suitable cushion 34 covers the top surface of the plywood base 27. Elongated first and second spacers 20A and 20B are positioned adjacent the opposed first and second sides 30 and 31 of the base 27 and are attached to the bottom surface of the plywood base 27 extending along the length thereof. The elongated first and second spacers 20A and 20B each have an inside surface 20i which forms part of the heat tunnel 7 and will be discussed further hereinafter. A rear spacer 35 is positioned adjacent the rear side 33 of the base 27 and is attached to the bottom surface of the plywood base 27 and disposed between the first and second elongated spacers 20A and 20B. A pair of blocks 14 are secured on the first and second elongated spacers 20A and 20 B and may be encased in a heat resistant material.

When the seat 3 is placed upon the housing 2 for use, the blocks 14 extend down into the housing 2 adjacent an inner sidewall thereof. An L-shaped metal bracket 9 is attached to the bottom edge of the rear spacer 35. One leg of the L-shaped bracket rests on the outside of the housing 2 and together with the blocks 14 act to stabilize the seat 3 upon the housing 2. As shown in FIG. 4, an angled ramp 16 is attached to the rear spacer 35 and extends between the elongated first and second spacers 20A and 20 B. The angled ramp 16 extends upwardly towards the bottom surface of the plywood base 27. A sheet of metal flashing 6 is attached to the elongated first and second spacers 20A and 20 B and extends from the front side 32 of the base 27 towards but not all of the way to the rear 33 of the base 27 such that a gap 21 is formed between the rear edge of the flashing 6 and the angled ramp 16. A front opening 26 is formed between a front edge of the flashing 6 and the front side 32 of the base 27. When the seat 3 is placed upon the housing 2, air can flow through the gap 21. The fresh air that comes through the opening 4 in the housing 2 is warmed by the lantern 5 and thus rises to the top of the housing 2 passing through gap 21 where it is channeled by the angled ramp 16 to pass between the inside surfaces of the first and second elongated spacers 20A and 20B and out through the front opening 26 at the front 32 of the seat 3 between an angler's legs so that they may warm their hands. Thus the heat tunnel 7 is formed of the gap 21, the angled ramp 16, the inside surfaces 20i of first and second spacers 20A and 20B, the bottom surface of the base 27, the flashing 6 and the front opening 26. The design of the heat tunnel 7 prevents any cross breezes/winds from diverting the heat away from the user's hands.

Referring to FIG. 2, the ice hot seat 1 has a handle 8, making it easy to carry when loading in everything needed for a fishing adventure. A band 11 encircles the housing 2 and is secured to one side 24 of the opening 4 at one end and at the other end secured to the opposing side 25 of the opening 4 by a pair of clips 17 which are best seen in FIGS. 1 and 3. A plurality of pockets 10 are secured to the band at regular intervals and provide a place to hold various items of fishing equipment or other things a fisherman might like to bring along on a fishing excursion. The ice hot seat 1 combines various pieces of equipment for the ice fisherman into one package, saving valuable space.

The ice hot seat 1, therefore provides a warm, comfortable place to sit as well as a light to attract fish at night. If the angler is wearing a coat instead of a one-piece coverall, the heat will rise up under the coat to help warm the angler or warm the angler's back when the heat is diverted toward the rear and captured by an overhanging coat.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A personal lighting and heating device comprising:
 a hollow cylindrical housing having a closed bottom and an open top, an opening near said closed bottom, said opening having a top, a bottom, and opposing sides;
 a lantern positioned within said housing near said opening configured to provide light and heat,
 a seat positioned on said open top of said housing, said seat comprising;
  a planar base having dimensions larger than said open top of said cylindrical housing, said planar base having a top surface and a bottom surface, opposed first and second sides, and opposed front and rear sides,
  first and second elongated spacers attached to said bottom surface of said planar base and extending along the length thereof, each of said first and second spacers having an inside surface, said first spacer positioned adjacent said first side of said planar base, said second spacer positioned adjacent said second side of said planar base,
  a rear spacer attached to said bottom surface of said planar base and positioned adjacent said rear side of said planar base and disposed between said first and second elongated spacers,
  an angled ramp attached to said rear spacer and positioned between said first and second elongated spacers and extending upwardly towards said bottom surface of said planar base, a sheet of flashing attached to said first and second elongated spacers extending from said front side of said planar base towards but not all the way to said rear side of said planar base such that a gap is formed between a rear edge of said flashing and said angled ramp, and a front opening is formed between a front edge of said flashing and said front side of said planar base;

wherein fresh air that comes through said opening is warmed by said lantern thus rising to said open top of said housing passing through said gap and channeled by said angled ramp to pass between said inside surfaces of said first and second spacers and out through said front opening such that a user may warm their hands.

2. The personal lighting and heating device of claim 1 wherein said opening comprises a stabilizing bar extending from said top to said bottom of said opening such that when weight is placed upon said housing, said opening will not buckle.

3. The personal lighting and heating device of claim 1 wherein said first and second elongated spacers comprise blocks secured thereto and wherein said rear spacer comprises an L-shaped bracket attached to a bottom edge thereof such that when said seat is placed upon said housing, said blocks extend down into said housing adjacent an inner sidewall thereof and wherein one leg of said L-shaped bracket rest on an outer sidewall of said housing to stabilize said seat upon said housing.

4. The personal lighting and heating device of claim 1 wherein a cushion is attached to said top surface of said planar base.

5. The personal lighting and heating device of claim 1 wherein said housing is lined with a semi-transparent reflective material to direct light out of said opening.

6. The personal lighting and heating device of claim 1 wherein said housing is made of a semi-transparent material.

7. The personal lighting and heating device of claim 1 wherein said housing further comprises a handle for making said device.

8. The personal lighting and heating device of claim 1 further comprising a band encircling said housing and is secured to said opposing sides of said opening by a pair of clips and wherein a plurality of pockets is secured to said band at regular interval to provide a place to hold various items.

* * * * *